United States Patent Office 3,140,313
Patented July 7, 1964

3,140,313
DI-[BIS(DIALKYLAMINO)BORYL]BENZENES
Kiyoshi Kitasaki, Garden Grove, and George W. Willcockson, Anaheim, Calif., assignors to United States Borax & Chemical Corporation, Los Angeles, Calif., a corporation of Nevada
No Drawing. Filed Jan. 2, 1962, Ser. No. 163,868
7 Claims. (Cl. 260—551)

The present invention relates as indicated to a new class of organoboron compounds, the di-[bis(dialkylamino)boryl]-benzenes, and has further reference to a method for preparing these compounds.

It is, therefore, the principal object of this invention to provide as new compositions of matter 1,3- and 1,4-di-[bis(dialkylamino)boryl]benzenes.

It is a further object of the present invention to provide a means for preparing 1,3- and 1,4-di-[bis(dialkylamino)-boryl]benzenes.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises di-[bis-(dialkylamino)-boryl]benzenes having the formula (R'$_2$N)$_2$B—R—B(NR'$_2$)$_2$ where R is a radical selected from the group consisting of 1,3-phenylene and 1,4-phenylene, and R' is an alkyl radical of from 1 to 4 carbon atoms.

The compounds of the present invention find utility as fuel additives, as additives for hydraulic fluids, as stabilizers for lubricating oils and greases, and as epoxy resin curing agents. These compounds find further utility in organic synthesis and as intermediates in the preparation of polymeric organoboron compounds. Thus, for example, when a di-[bis(dialkylamino)-oryl]benzene is reacted with either 3,3'-dihydroxy-4,4'-diaminodiphenyl or 3,3',4,4'-tetrahydroxydiphenyl a thermally stable polymeric compound, having the recurring structural unit

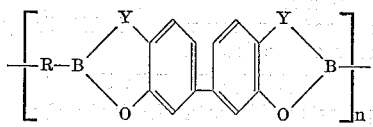

where R is either a 1,3-phenylene radical or a 1,4-phenylene radical and Y is either an imino (NH) radical or oxygen, is obtained.

The preparation of the present di-[bis(dialkylamino)-boryl]benzenes can best be illustrated by the following equation:

XMg—R—MgX+2ZB(NR'$_2$)$_2$ →
(R'$_2$N)$_2$B—R—B(NR'$_2$)$_2$+2MgXZ where X is either chlorine, bromine or iodine, Z is either chlorine or bromine, R is either a 1,3-phenylene radical or a 1,4-phenylene radical, and R' is a lower alkyl radical of from 1 to 4 carbon atoms. This reaction will proceed when either of the reactants is present in excess; however, for the sake of economy, in the preferred embodiment of of the invention we use stoichiometric amounts of the reactants.

The preferred method for performing the foregoing reaction is to slowly combine a diaminohaloborane with a suspension of the Grignard reagent in a hydrocarbon solvent at low temperatures and heat the reaction mixture to reflux. Under continued refluxing, solids are precipitated from the solution, and after precipitation is substantially complete, a tertiary amine is added to the reaction mass. Reflux is continued for a short period of time and the resultant slurry is allowed to cool to about ambient temperature. The solids are then removed from the cooled slurry by filtration and the desired product is recovered from the filtrate by distillation of the solvent and purified by fractional distillation or sublimation.

The first group of reactants applicable to the present invention are the Grignard reagents having the formula XMg—R—MgX, where X is either chlorine, bromine or iodine, and R is either 1,3-phenylene or 1,4-phenylene. These compounds are prepared by reaction of a meta- or para-dichloro, or dibromo, or diiodobenzene with magnesium in about a 1 to 2 molar ratio in the presence of an ethereal solvent such as tetrahydrofuran.

In the preferred embodiment of the invention we add a hydrocarbon solvent to the Grignard reagent-ether mixture, displace the ethereal solvent by distillation, and use the Grignard reagent as a suspension in the hydrocarbon solvent. The common hydrocarbon solvents, such as, for example, benzene, toluene, chlorobenzene, n-heptane, xylene, etc., are all applicable for use as the reaction medium in the present process.

The diaminohaloborane reactants applicable to the present invention have the formula ZB(NR'$_2$)$_2$ where Z is either chlorine or bromine, and R' is an alkyl of from 1 to 4 carbon atoms. It is to be noted that the amino groups of the applicable diaminohaloboranes are derived from the corresponding secondary amines. The following list is illustrative of the diaminohaloboranes applicable to the present invention:

Chlorobis(dimethylamino)borane
Chlorobis(diethylamino)borane
Chlorobis(diisopropylamino)borane
Chlorobis(di-n-butylamino)borane
Bromobis(diethylamino)borane
Bromobis(di-n-propylamino)borane
Bromobis(diisobutylamino)borane
Bromobis(dimethylamino)borane It is to be clearly understood that the foregoing list is only a partial enumeration of the diaminohaloboranes applicable to the present invention and is not intended to limit the invention.

The reaction mass obtained by reacting an applicable Grignard reagent with a diaminohaloborane contains a complex of the product and magnesium halide. In order to break the magnesium halide-product complex we add to the reaction mass from about 0.01 mole to about 3 moles per mole of Grignard reagent of a tertiary amine and then heat the resultant mixture under reflux for a short period of time. The solids are then removed from the resultant reaction mass by filtration and the product is recovered from the filtrate. The amine compounds which are applicable for breaking the magnesium halide-product complex are the trialkylamines having alkyl groups of from 2 to 20 carbon atoms, pyridine, N,N'-dimethylaniline.

So that the present invention can be more clearly understood, the following examples are given for illustrative purposes:

(I)

The Grignard reagent was prepared by heating under reflux a solution of 36.7 grams (0.156 mole) of p-dibromobenzene in 270 ml. of tetrahydrofuran with 7.45 grams (0.306 g. atom) of magnesium turnings and the tetrahydrofuran was slowly distilled and replaced by 300 ml. of benzene. The benzene suspension was chilled in an ice-salt bath and 40.3 grams (0.30 mole) of chlorobis-(dimethylamino)borane in 50 ml. of benzene was added over about a 0.5 hour period. The reaction mixture was then slowly heated to reflux and a clear solution was obtained. Under continued refluxing solids began to precipitate, and after about 14 hours the precipitation was substantially completed. Triethylamine, 34 grams (0.326 mole), was added to the reaction mass, and this mixture was heated under reflux for about 2 hours. The resultant slurry was cooled to about ambient temperature and the insoluble materials were removed by filtration. The filtrate was concentrated and the residual material was sublimed to give 19.2 grams (46.7% yield) of 1,4-di-[bis-(dimethylamino)boryl]benzene. Chemical analysis of this solid product yielded the following data:

Calculated for $C_{14}H_{28}B_2N_4$.—B=7.89%. Found in product B=7.70%.

(II)

The Grignard reagent was prepared by reacting under reflux a solution of 53.08 grams (0.225 mole) of m-dibromobenzene in 350 ml. of tetrahydrofuran with 11.04 grams (0.450 g. atom) of magnesium turnings, and the tetrahydrofuran was slowly distilled and replaced by 400 ml. of toluene. The toluene suspension was chilled in an ice-salt bath and 156.25 grams (0.45 mole) of bromobis-(di-n-butylamino)borane in 150 ml. of toluene was added over about a 0.5 hour period. The reaction mixture was then slowly heated to reflux and a clear solution was obtained. Under continued refluxing solids began to precipitate, and after about 12 hours the precipitation was substantially completed. Pyridine, 31.6 grams (0.40 mole), was added to the reaction mass, and this mixture was heated under reflux for about 2 hours. The resultant slurry was cooled to about ambient temperature, and the insoluble materials were removed by filtration. The filtrate was fractionally distilled and 66.23 grams (48.2% yield) of 1,3-di-[bis(di-n-butylamino)boryl]benzene was obtained. Chemical analysis of the solid product yielded the following data:

Calculated for $C_{38}H_{76}B_2N_4$.—B=3.54%. Found in product B=3.46%.

(III)

The Grignard reagent was prepared by reacting under reflux a solution of 65.99 grams (0.20 mole) of m-diiodobenzene in 300 ml. of diethylether with 9.73 grams (0.40 g. atom) of magnesium turnings, and the ether was slowly distilled and replaced by 325 ml. of xylene. The xylene suspension was chilled in an ice-salt bath and 98.66 grams (0.40 mole) of chlorobis(diisopropylamino)borane in 150 ml. of xylene was added over about a 0.5 hour period. The reaction mixture was then slowly heated to reflux and a clear solution was obtained. Under continued refluxing solids began to precipitate, and after about 12 hours the precipitation was substantially completed. N,N'-dimethylaniline, 36.4 grams (0.30 mole) was added to the reaction mass, and this mixture was heated under reflux for about 1 hour. The resultant slurry was cooled to about ambient temperature, and the insoluble materials were removed by filtration. The filtrate was fractionally distilled and 1,3-di-[bis(diisopropylamino)boryl]benzene was obtained. Chemical analysis of the product yielded the following data:

Calculated for $C_{30}H_{60}B_2N_4$.—B=4.34%. Found in product B=4.23%.

(IV)

The Grignard reagent was prepared by reacting under reflux a solution of 36.75 grams (0.25 mole) of p-dichlorobenzene in 275 ml. of tetrahydrofuran with 12.16 grams (0.50 mole) of magnesium turnings, and the tetrahydrofuran was slowly distilled and replaced by 350 ml. of benzene. The benzene suspension was chilled in an ice-salt bath and 117.5 grams (0.50 mole) of bromobis-(diethylamino)borane in 150 ml. of benzene was added over about a 0.5 hour period. The reaction mixture was slowly heated to reflux and a clear solution was obtained. Under continued refluxing solids began to precipitate and after about 10 hours the precipitation was substantially completed. Triisobutylamine, 66.2 grams (0.30 mole) was added to the reaction mass and this mixture was heated under reflux for about 2 hours. The resultant slurry was cooled to about ambient temperature, and the insoluble materials were removed by filtration. The filtrate was fractionally distilled and 1,4-di-[bis(diethylamino)boryl]benzene was obtained. Chemical analysis of this solid product yielded the following data:

Calculated for $C_{22}H_{44}B_2N_4$.—B=5.60%. Found in product B=5.47%.

Other modes of applying the principle of the invention may be employed, change being made as regards the details described, provided the features stated in any of the following claims or the equivalent of such be employed.

We, therefore, particularly point out and distinctly claim as our invention:

1. Di-[bis(dialkylamino)boryl]benzene of the formula

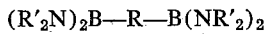

where R is a member selected from the group consisting of 1,3-phenylene and 1,4-phenylene and R' is alkyl of from 1 to 4 carbon atoms.

2. 1,4-di-[bis-(dimethylamino)boryl]benzene.
3. 1,3-di-[bis(di-n-butylamino)boryl]benzene.
4. 1,3-di-[bis(diisopropylamino)boryl]benzene.
5. 1,4-di[bis(diethylamino)boryl]benzene.

6. The method for preparing di-[bis(diaylkylamino)-boryl]benzenes and of the formula

which comprises slowly adding together a dimaniohaloborane of the formula $ZB(NR'_2)_2$ and a Grignard reagent having the formula XMg—R—MgX in the presence of a hydrocarbon solvent, heating said reaction mixture under reflux, adding to the resultant reaction mass from about 0.01 mole to about 2 moles per mole of Grignard reagent of a material selected from the group consisting of trialkylamines of from 2 to 20 carbon atoms, N,N'-dimethylaniline and pyridine, heating the reaction mass under reflux, allowing the resultant slurry to cool to about ambient temperature, removing the solids present by filtration and recovering the desired product from the filtrate; wherein R is a member selected from the group consisting of 1,3-phenylene and 1,4-phenylene, R' is alkyl of from 1 to 4 carbon atoms, Z is a halogen selected from the group consisting of bromine and chlorine and X is a halogen selected from the group consisting of chlorine, iodine and bromine.

7. The method for preparing di-[bis(dialkylamino)-boryl]benzenes of the formula

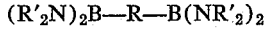

which comprises combining a diaminohaloborane of the formula $ZB(NR'_2)_2$ and a Grignard reagent having the formula XMg—R—MgX in about a 2 to 1 molar ratio in the presence of a hydrocarbon solvent, heating said reaction mixture under reflux, adding to the resultant reaction mass from about 0.01 mole to about 3 moles per mole of Grignard reagent of a material selected from the group consisting of trialkylamines of from 2 to 20 carbon atoms, N'N'-dimethylaniline, and pyridine, heating the reaction mass under reflux, allowing the resultant slurry to cool to about ambinet temperature, removing the solids present by filtration and recovering the desired product from the filtrate; wherein R is a member selected from the group consisting of 1,3-phenylene and 1,4-phenylene, R' is alkyl of from 1 to 4 carbon atoms, Z is a halogen selected from the group consisting of bromine and chlorine and X is a halogen selected from the group consisting of chlorine iodine and bromine.

References Cited in the file of this patent

Soloway: J. Am. Chem. Soc., vol. 82, No. 10 (1960).